United States Patent [19]

Rutan

[11] Patent Number: 5,670,026

[45] Date of Patent: Sep. 23, 1997

[54] IN-SERVICE CLEANING OF COLUMNS

[76] Inventor: Charles R. Rutan, 6055 E. FM 1462, Rosharon, Tex. 77563

[21] Appl. No.: 636,006

[22] Filed: Apr. 22, 1996

Related U.S. Application Data

[62] Division of Ser. No. 179,868, Jan. 11, 1994, Pat. No. 5,512,140.
[51] Int. Cl.$^6$ ............................ B01D 3/00; B01D 3/16; B08B 9/00
[52] U.S. Cl. ............................ 203/4; 203/52; 202/158; 202/163; 202/198; 202/241; 134/22.11; 134/22.12; 134/22.14; 134/167 C
[58] Field of Search ............................ 203/4, 52; 202/158, 202/163, 198, 241; 134/22.11, 22.12, 22.14, 167 C

[56] References Cited

U.S. PATENT DOCUMENTS

| | | | |
|---|---|---|---|
| 4,971,140 | 11/1990 | Stoss | 165/192 |
| 5,137,081 | 8/1992 | Klaren | 165/95 |
| 5,423,917 | 6/1995 | Garcia, Jr. | 134/1 |

*Primary Examiner*—Nina Bhat
*Attorney, Agent, or Firm*—Richard D. Fuerle; Arthur S. Cookfair

[57] ABSTRACT

A method of in-service cleaning an operating column by inserting into the column a lance through which a compatible liquid is dispensed at a pressure of at least about 5000 psig. Also disclosed is apparatus which comprises a column through which a fluid can pass, nozzles mounted on the outside of the column, where each nozzle comprises a flange welded to the column and a valve bolted to the flange, a lance which can be inserted through the nozzles into the column and means for dispensing a liquid through the lance at a pressure of at least about 5000 psig.

16 Claims, 3 Drawing Sheets

5,670,026

IN-SERVICE CLEANING OF COLUMNS

This application is a division of application Ser. No. 08/179,868, filed 11 Jan. 1994, now U.S. Pat. No. 5,512,140.

BACKGROUND OF THE INVENTION

This invention relates to a method of cleaning a column while it is in service and to apparatus comprising a column that can be cleaned while it is in service. In particular, it relates to the use of nozzles mounted on the outside of the column and to a lance that slides through the nozzles and emits a fluid under high pressure into the column during its operation.

In the manufacture of hydrocarbon products, heavy hydrocarbons such as diesel oil are cracked in furnaces into a mixture of smaller molecules such as ethylene, butadiene, benzene, and propylene. This mixture of hydrocarbons is cooled with circulating oil and is separated into its various component in a vertical column. The column contains a number of horizontal baffles or trays. The trays are perforated by a large number of holes which are covered with bubble or valve caps that permit gases to move upwards and liquids to move downwards in the column. Lighter products, such as ethylene, propylene, and aromatics, exit from the top of the column while liquids exit from the bottom of the column. Products of intermediate weight can be drawn off the column at different heights.

After the column has been in operation for some time, a buildup of small granules of polymer called "popcorn" polymer occurs. Some of the popcorn polymer plugs up the holes in the trays around the bubble caps, preventing the gases and liquids from moving easily through the column. This changes the temperature profile of the column so that the various fractions of the products do not exit the column at the correct locations. Also, the mix of products produced can be altered. For example, too much gasoline can be made. In order to correct this situation, it is necessary to shut down the column and decontaminate it so that personnel can enter and remove the popcorn polymer. Removal is accomplished using high pressure water hoses, scrapers, and chisels. It can require a hundred people working for two weeks to clean a column and put it back into operation again.

SUMMARY OF THE INVENTION

I have discovered that it is possible to clean a column while it is in operation. In my invention, which I call "petrolancing," it is not necessary to shut down the column and there is no exposure of personnel to the chemicals in the column. Nozzles, which can be opened or closed, are first mounted on the outside of the column. A lance is passed through the nozzles into the inside of the column. The lance emits a fluid under high pressure which dislodges or dissolves the popcorn polymer and cleans the column. While shutting down the column and cleaning it by hand can cost twenty million dollars, the cost of cleaning the same column according to the method of this invention is only about half a million dollars the first time, and subsequent cleanings are even less expensive.

BRIEF DESCRIPTION OF THE DRAWINGS

FIG. 3 is further explained in the example which follows.

DESCRIPTION OF THE PREFERRED EMBODIMENT

This invention is applicable to any type of vertical column in which fluids (gases or liquids) move that is subject to fouling. Examples of such columns include quench columns, reboilers, distillation columns, and heat exchangers. The fouling is usually due to the formation of popcorn polymer but other types of fouling can also be removed using the method and apparatus of this invention.

Figure 1:
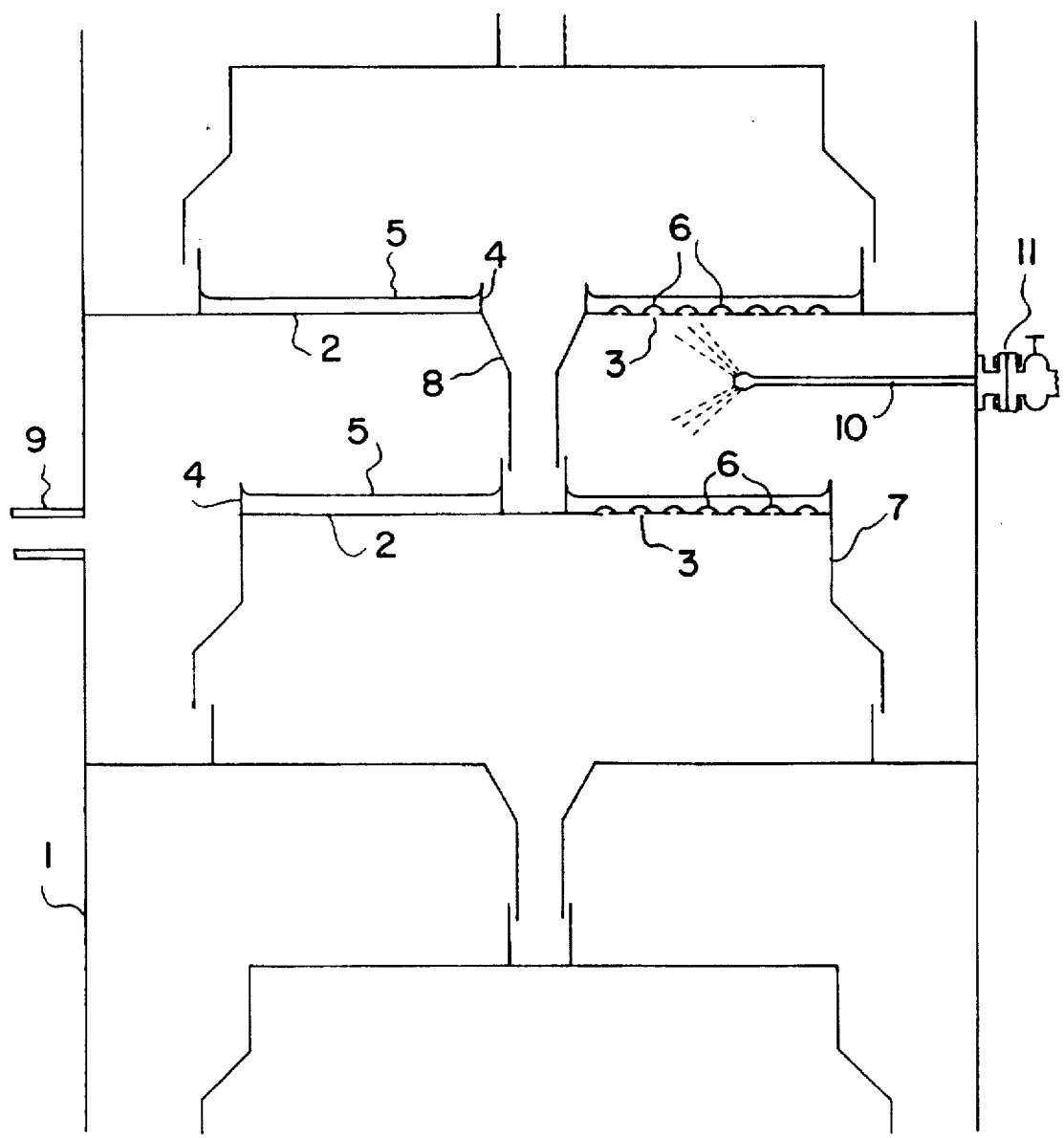
FIG. 1 is a side view in section of a portion of a column showing a nozzle and a lance according to this invention.

FIG. 1 shows the inside of a typical column. In FIG. 1, a large column 1 has mounted therein horizontal trays 2 having innumerable perforations 3 therethrough. A weir 4 around each tray 2 maintains a level of liquid 5 on the tray of an inch or two and valve caps 6 over each perforation 3 enable gases to pass upward through perforations 3 while permitting liquids to pass downward. The fouling typically occurs around these perforations. Each tray has a side downcomer 7 or a center downcomer 8 for overflowing liquid. A fluid mixture to be separated enters the column at 9. A lance 10 according to this invention is passed through nozzle 11 mounted on the side of column 1.

Figure 2:
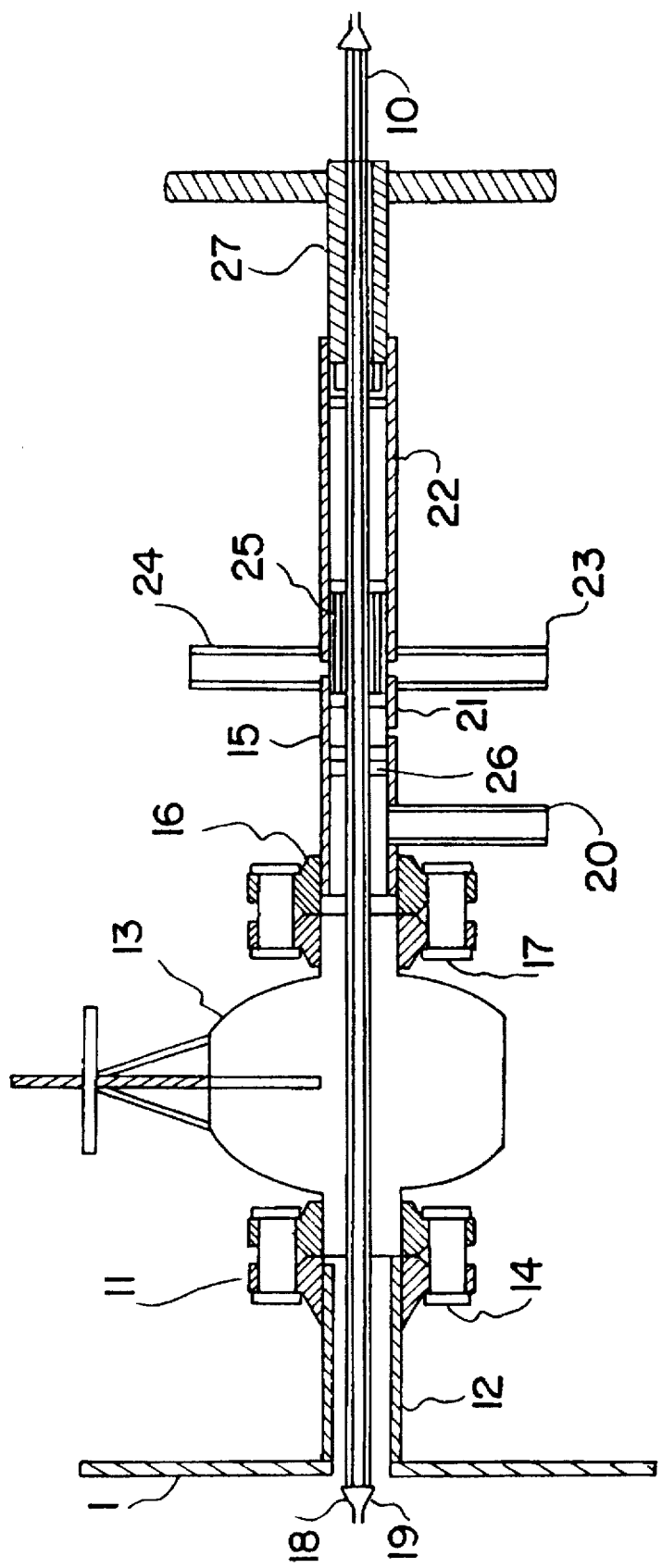
FIG. 2 is a side view in section showing in more detail a nozzle, and guide mounted on the side of a column.

FIG. 2 shows more detail of the apparatus of this invention for removing popcorn polymer and for cleaning a column. In FIG. 2, nozzle 11 consists of a flange 12 welded to the side of column 1 and a gate valve 13 bolted with bolts 14 to flange 12. Gate valve 13 is normally maintained in a closed position. When it is desired to clean the interior of the column 1 lance 10 is inserted into guide 15 and flange 16 of guide 15 is bolted to gate valve 13 by bolts 17. Nitrogen is passed through lance 10 to remove all water and oxygen from the system. The nitrogen leaves lance 10 through four perforations 18 in its tip 19 and then passes out drain 20 which can be sealed by means not shown. Guide 15 consists of a first portion 21 and a second portion 22 which are joined by water flush 23 and vent 24 through which cooling water is passed to cool lance 10. A packing gland 25 prevents the escape of the fluid used in lance 10 and column 1. A stop 26 prevents the accidental withdrawal of lance 10 beyond packing gland 25. A third portion 27 is used to seal the lance to packing gland 25. After clearing with nitrogen, gate valve 13 is opened and lance 10 is inserted and rotated inside column 1. While this being is done, a fluid under pressure of at least 1000 psig, and preferably of at least about 5000 psig, is passed through lance 10 into column 1. The fluid dislodges or dissolves the popcorn polymer and cleans the column while the column continues in operation. After the cleaning has been completed, lance 10 is withdrawn and gate valve 13 is closed. Nitrogen is again passed through lance 10, forcing the cleaning fluid out drain 20. Flange 16 is then unbolted and lance 10 and guide 15 are then moved to the next nozzle. In this way, cleaning proceeds until the entire column has been cleaned.

Because the column is not shut down during cleaning, it is necessary that the fluid used in the lance be compatible with the fluids in the column. That is, the fluid should either be a part of the product or be easily separable from the product. The fluid should also be a liquid at the operating temperature of the column. Examples of suitable fluids for a column separating hydrocarbons include various light hydrocarbon oils such as light fuel oil, gasoline, kerosene, and diesel.

The following example further illustrates this invention.

EXAMPLE

The invention was applied to a primary factionator (a quench oil column) which was used to separate the products from eight hydrocarbon cracking furnaces. The column was 26 feet in diameter, 130 feet high, and contained 27 horizontal trays. The column had a normal pressure drop between the bottom and top of about 2 psi, but an increase to over 4 psi indicated that the column was becoming fouled. Neutron back scatter measurements and gamma ray transmission scan measurements through the length of the column indicated that most of the blockage was at trays 15 and 16.

Initially a total of 12 hot taps 15 inches below tray 15 were required. Nozzles consisting of a flange welded to the outside of the column and a gate valve bolted to the flange were installed for lancing the downcomers of trays 15 and 16. Twenty four nozzles below tray 16 were then hot tapped so that the underside of the tray could be lanced. In order to lance the bottom side of the trays and the downcomers forty-six two-inch nozzles and hot taps were required. 1¼" diameter holes were hot tapped into the side of the column through the nozzles. The process temperature at this elevation (90 feet above grade) was approximately 300° F.

A lance was constructed of ¾" high strength stainless steel pipe with a ⅛" diameter tip. The lance tip had four nozzle holes spaced, starting at the top dead center and moving clockwise, at 10°, 170°, 190°, and 350°. Two tips were manufactured; one for 30 gpm (nozzle drilled to a diameter of 0.069 inches), and one for 15 gpm (nozzle drilled to a diameter of 0.0469 inches) at 7000 psig tip pressure. Two other tips were made; one with a nozzle hole diameter of 0.020 inches and the other with a nozzle hole diameter of 0.016 inches.

A 300 foot length of hydroblast hose was connected to a foot (diverter) valve from a hydroblast truck, a 100 foot hose was connected from the diverter valve to tray 16 downcomer, and a 50 foot length of hose connected from the foot valve to the lance. The hoses' exterior was 4 high strength steel interwoven braids and a nylon covering with a nylon-II interior that was chemically inert. These hoses were rated for 15,000 psig working pressure with a 51,000 psig burst pressure.

A double packing gland was constructed of carbon steel and flexible graphite braid packing. A packing sealant injection port was drilled and tapped into each packing area of the packing gland to provide a method of sealing the system if the braid packing failed. A double packing gland was installed to secure the lancing device. Utility water was used to maintain a positive pressure of 2 psig on the inner cavity of the packing gland above the column operating pressure, approximately 15 psig.

The field operator verified all the lineups. Proper care was exercised to prevent air from entering the column during the tapping and lancing. This was done to prevent a combustible mixture and any peroxy radicals from forming which would contribute to polymer growth. The entire system was thoroughly air and water freed. It was felt that violent flashing may occur when the water came in contact with the hot oil which might damage the column internals. Removal of air and water was accomplished by depressurizing with nitrogen three times, freeing the entire system before beginning the hot tapping. After the hot taps were completed and the lancing assembly was connected to the nozzle and air freed using nitrogen, the system was then inventoried with cutter stock and the lancing operation began.

CS (cutter stock), a non-naphthenic fuel oil cut, was used as the motive fluid for the lance. The CS was supplied at 80 psig and 90° F. by means of a temporary two-inch line connected to an existing ¾" stub-out from a carbon steel supply header. A hydroblast truck positive displacement pump suction pressure was limited to less than 120 psig. A pressure regulator was installed with a by-pass to control the CS supply pressure. The CS was supplied by means of a two inch temporary line installed at grade to a hydroblast truck pump that boosted the pressure of the CS to 10,000 psig with a maximum flow rate of 30 gpm, limited by the lance tip nozzle diameters. The trailer mounted hydro-blast setup and the diverter valve had to be extensively modified to prevent any CS from leaking to the atmosphere.

On the chance that there may have been some slight leakage around the packing gland during the lancing procedure, the lancing was a team effort. One person operated the lance, one person operated the foot valve, one person was stationed at the hydroblast truck, another was responsible for the adjustments to the packing gland, and a field operator assisted and maintained radio communication with the board operator. A utility water hose and absorbent material were maintained in the immediate area to allow for any material, other than water, that may leak through the packing gland to be absorbed and rinsed down. The double packing gland proved to eliminate leakage. In addition, a steam hose was maintained to allow dispersing vapors which could possibly leak from the system.

After the lineups were confirmed, the field operator notified the board operator that the system was ready to begin the lancing of the column. The board operator then made appropriate adjustments to account for the additional 15 gpm of cold CS to the column. This included reducing the column reflux and increasing the fuel oil draw. The nozzle valve was then opened, the person operating the lance valve controlled the rate of CS flow, 0 to 30 gpm maximum limited by the nozzles in the lance tip. Beginning the lancing operation, he made sure to notify the board operator at this time. The lancing crew monitored for leaks and corrected them as promptly as possible. If the leakage around the packing had become excessive and could not be controlled, the lancing would be discontinued. The column was lanced in a very deliberate manner, rotating the lance 45 degrees as the lance moved into the column at a rate of 2 feet per minute.

A unit operator was stationed at the column fuel oil filters, which filters liquid from the bottom of the column, so that if the filter differential became excessive the flow could be diverted to the stand-by filter. If both filters were taken out of service at the same time the lancing operation would have stopped. Operations would contact the lance team by radio to stop the lancing if this situation arose. The length of time required for the operations personnel to maintain a watch of the filters depended on the amount of polymer washed from the trays. The plugged filter was removed immediately and cleaned, following standard unit procedures. Once the filters had been replaced, if both were out of service at the same time, and the flow to one of the filters was reestablished, the lancing procedure then resumed.

The lance was withdrawn at the same rate as the rate of insertion. Once the lance had been withdrawn from the column, the field operator notified the board operator that the lancing operation was complete. At this point the lancing valve was closed, then the 2" gate valve on the quench column and the ¾" valve downstream of the utility water pressure regulator were closed.

The tray 15 downcomer was the first nozzle lanced, then the bottom of tray 15 was lanced. The downcomer of tray 16 was then lanced after the second nozzle of tray 15 was completed. This was due to the bridging of the polymer that resulted in differential pressure spikes, and was to protect the column from plugging with the polymer that was being broken free.

The pressure loss from the pump to the diverter valve totaled 2600 psig at a flow rate of 15 gpm. The head required by the elevation was 42 psig and the friction loss in the hose and fittings was 2558 psig or 8.5 psig/ft. Therefore the total system pressure loss was 3206 psig. The tip pressure was 10.000 psig–3026 psig=6973 psig at 15 gpm.

After the completion of the lancing between trays 15 and 16 the pressure drop across both trays was normal, so no further cleaning of tray 16 was required. However, a total of 14 additional taps were made between trays 1 through 9, 10 through 14, and between 16 and 17. This allowed operations to define which trays had the highest differential pressures such that they could be cleaned.

The indications that the downcomer and/or the tray obstructions had been cleared included:

1. A reduction in the quench column pressure drop,
2. A cooling of the column temperature above tray 20, and
3. A sudden increase in the column sump level.

Figure 3:
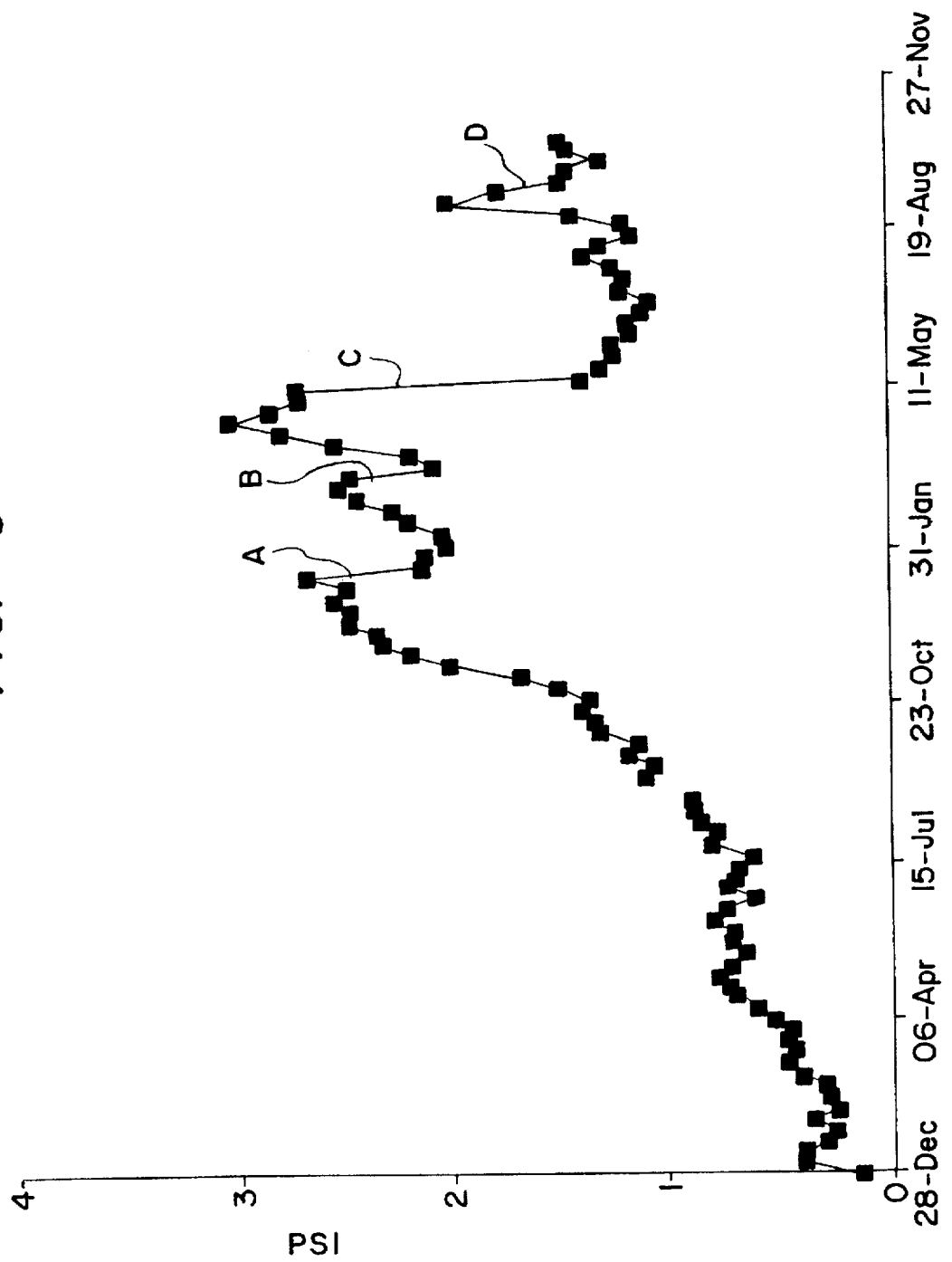
FIG. 3 is a graph showing the pressure drop between the bottom and the top of a column over a period of eleven months.

Shortly after the initial lancing the differential pressure of the quench column began to rise. From the pressure surveys the trays that had become fouled were identified. Additional scaffolding was required to hot tap and petrolance the remaining trays. FIG. 3 shows the pressure drops that occurred when the column was petrolanced (A, B, C, and D) according to this invention. It should be noted that when tray 4 was lanced the most significant reduction in the quench column's differential pressure occurred (C in FIG. 3). A total of 128 taps were performed and 13 trays were cleaned using the method of this invention while the column continued in operation.

I claim:

1. A method of cleaning a column while it is in service comprising inserting a lance into said column and passing a compatible liquid through said lance into said column at a pressure of at least about 1000 psig.

2. A method according to claim 1 wherein said pressure is at least about 5000 psig.

3. A method according to claim 1 wherein said lance is inserted through a nozzle which comprises a flange welded to the side of said column and a valve bolted to said flange.

4. A method according to claim 3 wherein said lance is inserted through a guide which is bolted to said valve.

5. A method according to claim 4 wherein said guide has a stop that prevents the withdrawal of said lance therefrom.

6. A method according to claim 4 wherein said guide contains a packing gland and means for cooling said lance.

7. A method according to claim 1 wherein said column is used to separate a mixture of hydrocarbons.

8. A method according to claim 1 wherein said liquid is cutter stock.

9. A method of preparing a column for in-service cleaning comprising mounting nozzles on the outside of said column through which a lance can be inserted into said column, said nozzles comprising a flange welded to said column and a valve bolted to said flange.

10. In a process for separating hydrocarbons in a vertical column containing horizontal perforated trays, wherein small granules of polymer form which plug the perforations in said trays, a method of removing said granules from said perforations during said process comprising inserting a lance into the side of said column and spraying said trays with a compatible liquid forced through said lance at a pressure of at least about 1000 psig.

11. A method according to claim 10 wherein said pressure is at least about 5000 psig.

12. A method according to claim 10 wherein said lance is inserted through a nozzle which comprises a flange welded to the side of said column and a valve bolted to said flange.

13. A method according to claim 12 wherein said lance is inserted through a guide which is bolted to said valve.

14. A method according to claim 13 wherein said guide has a stop that prevents the withdrawal of said lance therefrom.

15. A method according to claim 10 wherein said column is used to separate a mixture of hydrocarbons.

16. A method of cleaning a vertical column while said column is in service comprising (a) welding at least one flange to the side of said column;
(b) bolting a valve to said flange to form a nozzle;
(c) inserting a lance into said column through at least one nozzle; and
(d) passing a compatible liquid through said lance into said column at a pressure of at least about 1000 psig.

* * * * *